(12) United States Patent
Pfefferle

(10) Patent No.: US 6,205,777 B1
(45) Date of Patent: Mar. 27, 2001

(54) CATALYTIC METHOD

(75) Inventor: William C. Pfefferle, Middletown, NJ (US)

(73) Assignee: Precision Combustion, Inc., New Haven, CT (US)

( * ) Notice: Subject to any disclaimer, the term of this patent is extended or adjusted under 35 U.S.C. 154(b) by 0 days.

(21) Appl. No.: 08/377,861

(22) Filed: Jan. 25, 1995

Related U.S. Application Data

(63) Continuation-in-part of application No. 07/918,250, filed on Jul. 23, 1992, now abandoned, which is a continuation-in-part of application No. 07/639,011, filed on Jan. 9, 1991, now abandoned.

(51) Int. Cl.[7] ........................................... F01B 3/00
(52) U.S. Cl. ................................. 60/308; 60/299
(58) Field of Search ................................ 60/308, 299, 274

(56) References Cited

U.S. PATENT DOCUMENTS

| | | | |
|---|---|---|---|
| 3,460,916 | * | 8/1969 | Aronsohn ................................ 60/299 |
| 3,776,201 | * | 12/1973 | Sabet ...................................... 60/308 |

FOREIGN PATENT DOCUMENTS

| | | | |
|---|---|---|---|
| 70222 | * | 6/1977 | (JP) ........................................ 60/308 |
| 70223 | * | 6/1977 | (JP) ........................................ 60/308 |

* cited by examiner

*Primary Examiner*—Thomas E. Denion
(74) *Attorney, Agent, or Firm*—Dreier & Baritz LLP

(57) ABSTRACT

An emissions control system for rich-burn internal combustion engines, includes a reaction chamber for thermal oxidation of exhaust gas fuel values. A passive means utilizes exhaust flow energy for induction of air into engine exhaust gas, and a duct transfers the exhaust gas together with the inducted air into the reaction chamber for thermal oxidation. To achieve a high degree of efficiency the thermal oxidation is facilitated by through mixing of air and exhaust gas to insure gas phase thermal reaction.

7 Claims, 1 Drawing Sheet

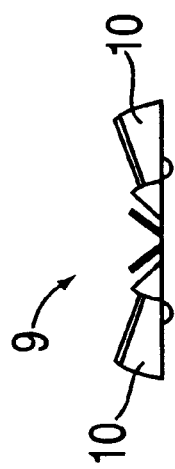
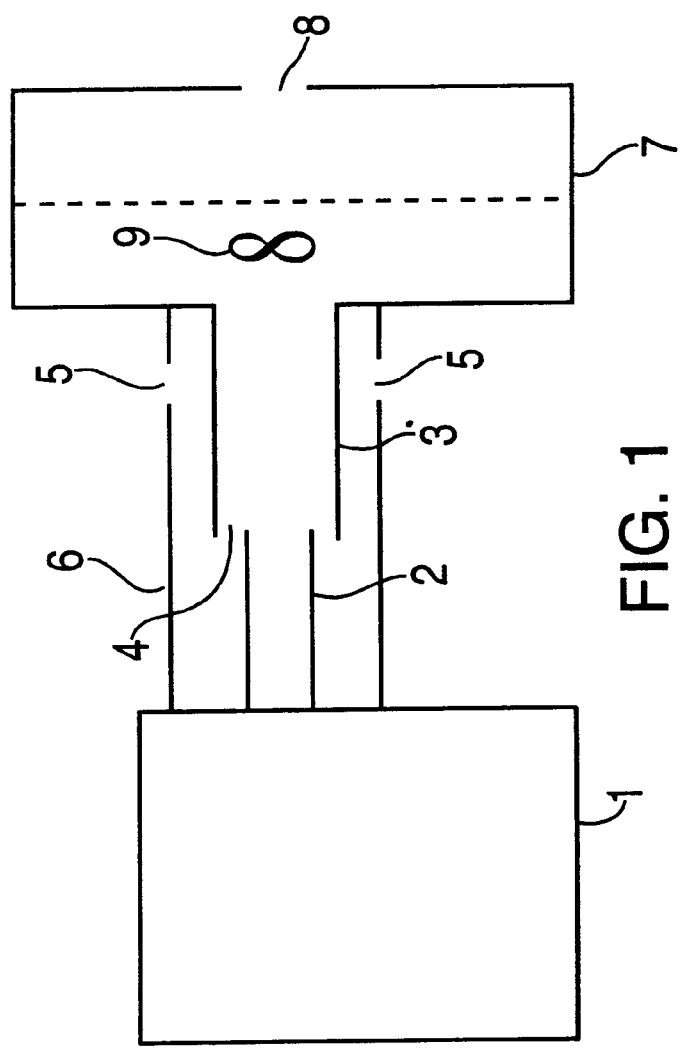

CATALYTIC METHOD

CROSS-REFERENCE TO RELATED APPLICATION

This application is a Continuation-In-Part of my U.S. Pat. application Ser. No. 07/918,250 filed Jul. 23, 1992 now abandoned and which was a Continuation-In-Part of my then U.S. Pat. application Ser. No. 07/639,011 filed Jan. 9, 1991 and now abandoned.

BACKGROUND OF THE INVENTION

1. Field of the Invention

This invention relates to improved systems for control of exhaust emissions from gases containing fuel values. In one specific aspect the invention relates to catalytic systems for control of exhaust emissions from internal combustion engines. This invention also relates to passive emissions control devices for fuel-rich internal combustion engines.

2. Brief Description of the Prior Art

Exhaust emissions from small internal combustion engines, such as are used for lawn mowers and small generator sets, are a significant source of atmospheric pollution by hydrocarbons and carbon monoxide. Such engines typically operate fuel-rich and therefore are particularly dirty as compared to an automotive engine without a catalytic converter. Although automotive emissions are now controlled by use of catalytic converters, such conventional devices are not considered feasible for small engine use because of inherently large size, high cost and system complexity relating to the need for air addition. Effective means of suitable size and simplicity are required not only for the reactor itself but also for the addition and mixing of the air needed for oxidation of the exhaust fuel values to carbon dioxide and water.

The present invention meets these needs by providing a passive system for the combustion of the fuel values in the exhaust gases from engines which operate fuel-rich. The system is simple and relatively inexpensive.

SUMMARY OF THE INVENTION

Definition of Terms

As used in the present invention the term "passive" as applied to emissions control devices, systems or components thereof refers to such devices or components which do not require moving parts to function. For example, a conventional catalytic converter is a passive device but a converter system utilizing a mechanical air pump for air addition is not passive.

The terms "monolith" and "monolith catalyst" refer not only to conventional monolithic structures and catalysts such as employed in conventional catalytic converters but also to any equivalent unitary structure such as an assembly or roll of interlocking sheets or the like.

The terms "Microlith™" and "Microlith™catalyst" refer to high open area monolith catalyst elements with flow paths so short that reaction rate per unit length per channel is at least fifty percent higher than for the same diameter channel with a fully developed boundary layer in laminar flow, i.e. a flow path of less than about two mm in length, preferably less than one mm or even less than 0.5 mm and having flow channels with a ratio of channel flow length to channel diameter less than about two to one, but preferably less than one to one and more preferably less than about 0.5 to one. Channel diameter is defined as the diameter of the largest circle which will fit within the given flow channel and is preferably less than one mm or more preferably less than 0.5 mm. Microlith™ catalysts may be in the form of woven wire screens, pressed metal or ceramic wire screens or even pressed thin ceramic plates and have as many as 100 to 1000 or more flow channels per square centimeter. Flow channels may be of any desired shape.

The terms "carbonaceous pollutant" and "hydrocarbon" as used in the present invention not only refer to organic compounds, including conventional liquid and gaseous fuels, but also to gas streams containing fuel values in the form of compounds such as carbon monoxide, organic compounds or partial oxidation products of carbon containing compounds.

The term "muffler" as used herein means a multi-chamber device containing a baffle, through which the exhaust fumes of an internal combustion engine are directed to deaden sounds emanating from the engine.

The Invention

It has now been found that carbonaceous emissions levels from small internal combustion engines which operate fuel-rich can be reduced to very low levels by using the kinetic energy of the high velocity pulses of the exhaust flow to induct and mix sufficient air into the exhaust gases for thermal oxidation of fuel values to carbon dioxide and water in a subsequent reaction zone.

Advantageously, gas phase combustion of the mixture of air and exhaust gases is catalytically stabilized by contact with a catalytic surface. Although catalytic stabilization offers smooth combustion over a wide range of operating conditions, it has been demonstrated that if the exhaust gas is hot enough and sufficiently fuel-rich, gas phase combustion can be stabilized with the backmixing of a conventional baffled muffler even without catalytic stabilization. Thus, the present invention makes possible economic achievement of ultra low emission levels of carbon monoxide and hydrocarbons even with small internal combustion engines. The term "small internal combustion engine" as used herein means an internal combustion engine having a displacement of less than about 800 cc, preferably between 100 and 600 cc.

In a preferred embodiment of the present invention, the engine exhaust is ducted through a nozzle attached to the engine and jetted into the open end of a duct thereby entraining sufficient air for thermal oxidation of at least a major portion of the fuel values contained therein in a downstream reaction zone. Advantageously, the receiving duct may be a venturi tube. Advantageously, gas phase reactions are catalytically stabilized in a well mixed thermal reaction zone. The efficient, rapid thermal combustion which occurs is believed to result from the injection of heat and free radicals produced by the catalyst surface reactions at a rate sufficient to counter the quenching of free radicals which otherwise minimize thermal reaction even at combustion temperatures much higher than those found to be feasible in the method of the present invention.

BRIEF DESCRIPTION OF THE DRAWINGS

FIG. 1 shows a schematic of a passive catalytically stabilized thermal reaction system for reduction of pollutants from a single cylinder, small gasoline engine.

FIG. 2 is a side view of a swirler means for mixing gases for combustion.

DETAILED DESCRIPTION OF THE INVENTION AND PREFERRED EMBODIMENTS

The present invention is further described in connection with the drawing. As shown in FIG. 1, in one preferred embodiment the exhaust from a small gasoline engine 1 passes through exhaust line 2, which serves as an air inductor nozzle, into line 3 thereby entraining air through opening 4 in line 3 and through openings 5 in shroud 6. The exhaust gas and the mixed-in added air pass from line 3 into muffler 7. Gases exiting muffler 7 pass through vent openings 8. Advantageously the gases may enter muffler 7 into contact with a swirler 9 to promote mixing and thus reaction of fuel values. A swirler may also be employed to create a low pressure region near the muffler inlet and thus inhibit backflow of gases through the open end of line 3. Swirler 9 functions as a means for inducing effective recirculation of gases flowing through the muffler 7. A more complete mixing of the gases occurs with creation of swirling currents in the muffler 7. FIG. 2 is a side view of a representative swirler 9 and shows a spiral arrangement of vanes 10 whereby the energy of entering gases is used to induce a rolling motion within the gases remaining in muffler 7. The vanes 10 of swirler 9 cause the incoming gases to enter muffler 7 in a turbulent flow, causing a portion of the entering gases to reverse the direction of their flow. Other means of creating recirculation of gases in the muffler 7 will be recognized by those skilled in the art. Typically, engine operation is sufficiently rich to allow gas phase thermal combustion of the exhaust gas fuel values. In this case at least portions of the muffler 7 internal wall surfaces are coated with a noble metal catalyst, preferably a platinum metal, to ignite and stabilize combustion thus permitting efficient combustion of the fuel values over a wide range of operating conditions. This results in very low emissions of carbonaceous pollutants.

Shroud 6 surrounds opening 4 in line 3 serving as a sound shield to muffle exhaust pulse noise emanating from opening 4 and to permit ducting air from an engine or muffler air cooling jacket to further minimize escape of sound. Shroud 6 also serves to contain any back flow leakage from line 3.

EXAMPLE I

Fuel rich exhaust gas from a small Briggs and Stratton single cylinder gasoline powered spark ignition engine having a displacement of less than about 400 cc driving an electrical generator was passed through an exhaust pipe of conventional size discharging as an injector nozzle into a larger pipe and inducting air through the opening between the discharge nozzle and the outer pipe. The exhaust gases with entrained air were passed to a conventional Briggs and Stratton Super Lo-Tone muffler (Part No. 490,547) which had been modified by the addition of a coating of a platinum catalyst to the internal baffle plate surfaces to ignite and stabilize thermal reactions in the muffler and by addition of fixed swirler vanes opposite the muffler inlet. Thermal reaction of the fuel values in the exhaust gases with the oxygen in the inducted air resulted in low exhaust emissions over the full operating range from idle to full load as shown in the following table.

|  | Exit Temp. | HC, ppm* | CO, % |
|---|---|---|---|
| idle | 825 K | 40 | 0.2 |
| ¼ load | 858 K | 10 | 0.2 |
| ½ load | 903 K | 3 | 0.15 |
| ¾ load | 945 K | 1 | 0.2 |
| full load | 993 K | 0 | 0.3 |

*as measured by NDIR automotive analyser

In contrast to a conventional mass transfer limited catalytic converter, conversion of carbon monoxide remained essentially constant over a wide range of exhaust flows and conversion of hydrocarbons actually increased with increase in flow. Typical uncontrolled emissions levels for this engine were 370 ppm hydrocarbons and 4.9 percent carbon monoxide at idle, 340 ppm hydrocarbons and 6.2 percent carbon monoxide at half load, and 320 ppm hydrocarbons and 7.8 percent carbon monoxide at full load.

What is claimed is:

1. An emissions control system for a rich-burn, small internal combustion engine, which comprises;

a. a small internal combustion engine having mounted on the exhaust thereof an engine noise muffler;

b. a reaction chamber within the engine exhaust muffler for thermal oxidation of fuel values in the engine exhaust;

c. means within the reaction chamber for inducing effective recirculation of the exhaust flowing through said reaction chamber, and creating a low pressure region in the reaction chamber proximal the chamber inlet;

d. passive means to utilize exhaust flow energy as the sole means for induction of air into the engine exhaust; and e. duct means for transfer of said exhaust together with said inducted air into said reaction chamber.

2. The system of claim 1 wherein the engine has a displacement of less than about 800 cc.

3. The system of claim 1 wherein the engine is a single cylinder engine.

4. The system of claim 1 wherein at least a portion of the internal walls of said reaction chamber comprise a catalyst to stabilize thermal combustion.

5. The system of claim 4 in which the catalyst comprises a platinum group metal.

6. The system of claim 1 wherein the air inlet of said passive air induction means is encased in a shroud to muffle exhaust pulse noise.

7. The system of claim 1 wherein said passive air induction means is a flow jet injector.

* * * * *